US012476362B2

(12) United States Patent
Mansour et al.

(10) Patent No.: US 12,476,362 B2
(45) Date of Patent: Nov. 18, 2025

(54) MULTI-STACK ANTENNA

(71) Applicant: T-MOBILE INNOVATIONS LLC, Overland Park, KS (US)

(72) Inventors: Nagi A. Mansour, Arlington, VA (US); Akin Ozozlu, McLean, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 386 days.

(21) Appl. No.: 17/985,718

(22) Filed: Nov. 11, 2022

(65) Prior Publication Data

US 2024/0162609 A1 May 16, 2024

(51) Int. Cl.
*H01Q 3/40* (2006.01)
*H01Q 9/04* (2006.01)

(52) U.S. Cl.
CPC ............. *H01Q 3/40* (2013.01); *H01Q 9/0414* (2013.01)

(58) Field of Classification Search
CPC ...... H01Q 3/40; H01Q 9/0414; H01Q 3/2652; H01Q 21/065; H01Q 3/36; H04B 7/0617
See application file for complete search history.

(56) References Cited

U.S. PATENT DOCUMENTS

2015/0237510 A1* 8/2015 Kludt .................... H04W 16/28 370/328
2019/0115664 A1* 4/2019 Veihl ........................ H01Q 5/50

FOREIGN PATENT DOCUMENTS

WO WO-2005053185 A1 * 6/2005 ........... H04B 7/0615

OTHER PUBLICATIONS

English translation of WO 2005/053185 A1 (Year: 2005).*

* cited by examiner

*Primary Examiner* — Vladimir Magloire
*Assistant Examiner* — Naomi M Wolford
(74) *Attorney, Agent, or Firm* — Shook, Hardy & Bacon LLP

(57) ABSTRACT

A multi-stack phased antenna array system is provided for enhancing wireless signal performance in a network. The system includes at least two antenna element layers, each comprising a matrix of individual antenna elements. Each antenna element is electrically connected to a modular ratio combining engine configured to process signals across the array. A method of operation includes receiving at least one signal from at least one user equipment (UE) at the antenna array, wherein the signal is received by each antenna element. The received signals are adjusted in time and phase to maximize in-phase signal strength using the combining engine. At least one dielectric layer is disposed between the antenna element layers to support the stacked structure.

19 Claims, 6 Drawing Sheets

MULTI-STACK ANTENNA

BACKGROUND

Phased antenna array systems have been increasingly used for a variety of applications. The phased antenna array systems are desirable for their high directivity, narrow beams, beamforming, and scanning in systems as diverse as data links, radar communications, and synthetic aperture imaging. The transmitting elements used in phased antenna arrays have been microstrip patches, Vivaldi antennas, and dipoles, because of their high gain and directionality. The narrow beamwidth and linear polarization restricts use of phased antenna arrays in many applications, such as wireless networks.

SUMMARY

A high-level overview of various aspects of the present technology is provided in this section to introduce a selection of concepts that are further described below in the detailed description section of this disclosure. This summary is not intended to identify key or essential features of the claimed subject matter, nor is it intended to be used as an aid in isolation to determine the scope of the claimed subject matter.

According to aspects herein, methods, apparatus, and systems are provided for a multi-stack antenna. The method of operating a multi-stack antenna begins with receiving at least one signal from at least one user equipment (UE) at a multi-stack phased antenna array. The at least one signal is received by each antenna element of the multi-stack phased antenna array. The at least one signal is then modified by adapting a received signal from each antenna element in time and phase to maximize in-phase signal strength.

In a further embodiment, a multi-stack phased antenna array is provided. The antenna includes at least two antenna element layers with the at least two antenna element layers comprising a matrix of individual antenna elements. Each individual antenna element is electrically connected to a modular ratio combining engine. At least one dielectric layer is disposed between the at least two antenna element layers.

An additional embodiment provides a non-transitory computer storage media storing computer-useable instructions that, when executed by one or more processors cause the processors to receive at least one signal from at least one UE at a multi-stack phased antenna array, with the at least one signal being received by each antenna element of the phased antenna array. The received signal is then adapted by the processors to adjust a received signal from each antenna element in time and phase to maximize in-phase signal strength.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

Figure 1:
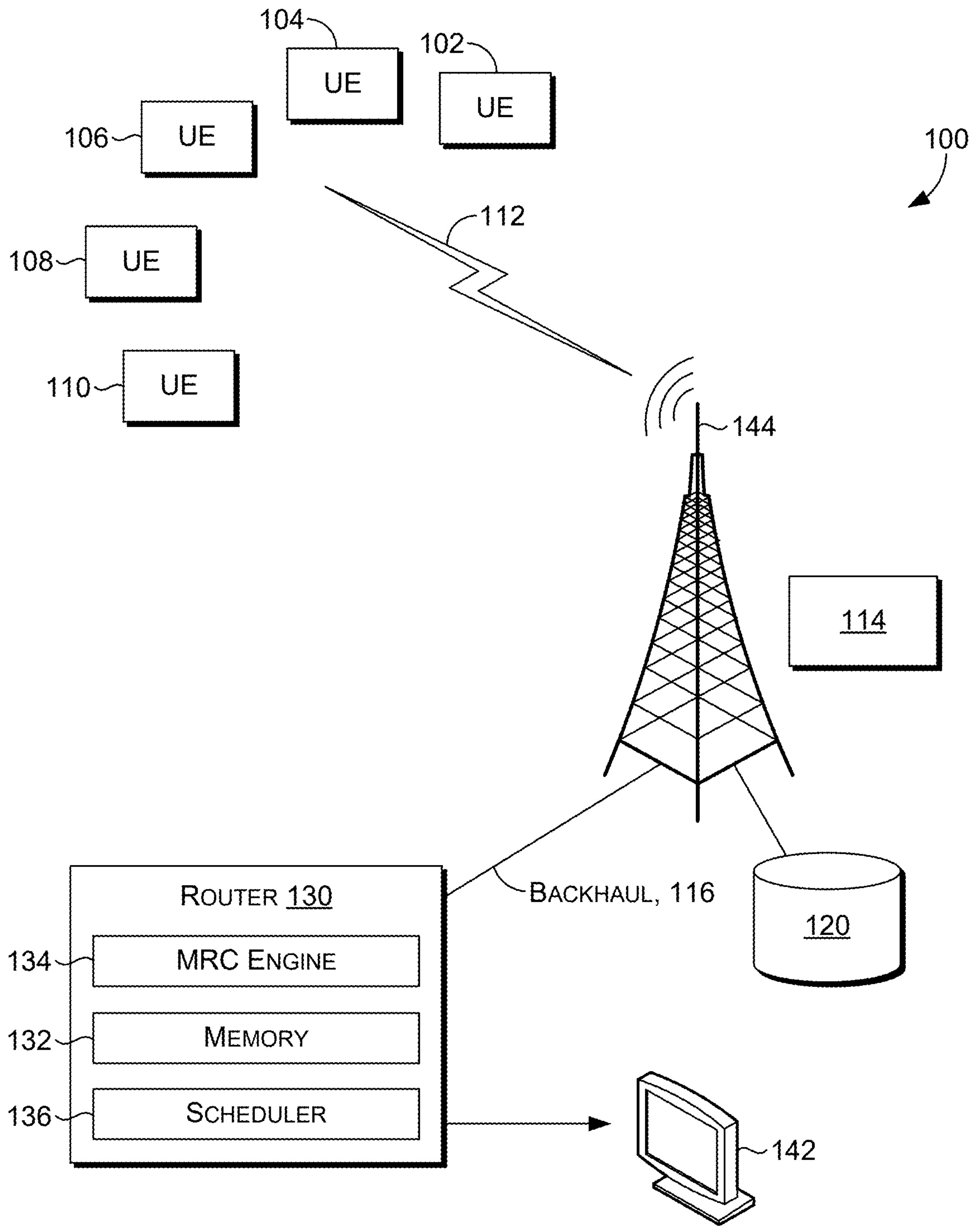
FIG. 1 depicts a diagram of an exemplary network environment in which implementations of the present disclosure may be employed, in accordance with aspects herein.

The subject matter of embodiments of the disclosure is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
5G Fifth-Generation Cellular Communication System
6G Sixth-Generation Cellular Communication System
AI Artificial Intelligence
CD-ROM Compact Disk Read-Only Memory
CDMA Code-Division Multiple Access
eNodeB Evolved Node B
GIS Geographic/Geographical/Geospatial Information System
gNodeB Next Generation Node B
GPRS General Packet Radio Service
GSM Global System for Mobile communications
iDEN Integrated Digital Enhanced Network
DVD Digital Versatile Disc
EEPROM Electrically Erasable Programmable Read Only Memory
LED Light-Emitting Diode
LTE Long-Term Evolution
MIMO Multiple-Input Multiple-Output
MD Mobile Device
ML Machine Learning
PC Personal Computer
PCS Personal Communications Service
PDA Personal Digital Assistant
PDSCH Physical Downlink Shared Channel
PHICH Physical Hybrid ARQ Indicator Channel
PUCCH Physical Uplink Control Channel
PUSCH Physical Uplink Shared Channel RAM Random-Access Memory
RET Remote Electrical Tilt
RF Radio Frequency
RFI Radio-Frequency Interference
R/N Relay Node
RNR Reverse Noise Rise
ROM Read-Only Memory
RSRP Reference Transmission Receive Power
RSRQ Reference Transmission Receive Quality
RSSI Received Transmission Strength Indicator
SINR Transmission-to-Interference-Plus-Noise Ratio
SNR Transmission-to-Noise ratio
SON Self-Organizing Networks
TDMA Time-Division Multiple Access
TXRU Transceiver (or Transceiver Unit)
UE User Equipment
UMTS Universal Mobile Telecommunications Systems
WCD Wireless Communication Device (interchangeable with UE)

Further, various technical terms are used throughout this description. An illustrative resource that fleshes out various aspects of these terms can be found in *Newton's Telecom Dictionary,* 25th Edition (2009).

Embodiments of the present technology may be embodied as, among other things, a method, apparatus, system, or computer-program product. Accordingly, the embodiments may take the form of a hardware embodiment, or an embodiment combining software and hardware. An embodiment takes the form of a computer program product that includes computer-useable instructions embodied on one or more computer-readable media.

Computer-readable media include both volatile and nonvolatile media, removable and non-removable media, and contemplate media readable by a database, a switch, and various other network devices. Network switches, routers, and related components are conventional in nature, as are means of communicating with the same. By way of example, and not limitation, computer-readable media comprise computer storage media and communications media.

Computer storage media, or machine-readable media, include media implemented in any method or technology for storing information. Examples of stored information include computer-useable instructions, data structures, program modules, and other data representations. Computer storage media include, but are not limited to RAM, ROM, EEPROM, flash memory or other memory technology, CD-ROM, digital versatile discs (DVDs), holographic media or other optical disc storage, magnetic cassettes, magnetic tape, magnetic disk storage, and other magnetic storage devices. These memory components can store data momentarily, temporarily, or permanently.

Communications media typically store computer-useable instructions-including data structures and program modules-in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, a traditional telecommunications network employs a plurality of base stations (i.e., nodes, cell sites, cell towers, etc.) to provide network coverage. The base stations are employed to broadcast and transmit transmissions to user devices of the telecommunications network. A base station may be considered to be a portion of a base station that may comprise an antenna, a radio, and/or a controller. In aspects, a base station is defined by its ability to communicate with a user equipment (UE), such as a wireless communication device (WCD), according to a single protocol (e.g., 3G, 4G, LTE, 5G, or 6G, and the like); however, in other aspects, a single base station may communicate with a UE according to multiple protocols. As used herein, a base station may comprise one base station or more than one base station. Factors that can affect the telecommunications transmission include, e.g., location and size of the base stations, and frequency of the transmission, among other factors. The base stations are employed to broadcast and transmit transmissions to user devices of the telecommunications network. Traditionally, the base station establishes uplink (or downlink) transmission with a mobile handset over a single frequency that is exclusive to that particular uplink connection (e.g., an LTE connection with an EnodeB). In this regard, typically only one active uplink connection can occur per frequency. The base station may include one or more sectors served by individual transmitting/receiving components associated with the base station (e.g., antenna arrays controlled by an EnodeB). These transmitting/receiving components together form a multi-sector broadcast arc for communication with mobile handsets linked to the base station.

As used herein, "base station" is one or more transmitters or receivers or a combination of transmitters and receivers, including the accessory equipment, necessary at one location for providing a service involving the transmission, emission, and/or reception of radio waves for one or more specific telecommunication purposes to a mobile station (e.g., a UE), wherein the base station is not intended to be used while in motion in the provision of the service. The term/abbreviation UE (also referenced herein as a user device or wireless communications device [WCD]) can include any device employed by an end user to communicate with a telecommunications network, such as a wireless telecommunications network. A UE can include a mobile device, a mobile broadband adapter, or any other communications device employed to communicate with the wireless telecommunications network. A UE, as one of ordinary skill in the art may appreciate, generally includes one or more antennas coupled to a radio for exchanging (e.g., transmitting and receiving) transmissions with a nearby base station. A UE may be, in an embodiment, similar to device 600 described herein with respect to FIG. 6.

As used herein, UE (also referenced herein as a user device or a wireless communication device) can include any device employed by an end user to communicate with a wireless telecommunications network. A UE can include a mobile device, a mobile broadband adapter, a fixed location or temporarily fixed location device, or any other communications device employed to communicate with the wireless telecommunications network. For an illustrative example, a UE can include cell phones, smartphones, tablets, laptops, small cell network devices (such as microcell, picocell, femtocell, or similar devices), and so forth. Further, a UE can include a sensor or set of sensors coupled with any other communications device employed to communicate with the wireless telecommunications network, such as, but not limited to, a camera, a weather sensor (such as a rain gauge, pressure sensor, thermometer, hygrometer, and so on), a motion detector, or any other sensor or combination of sensors. A UE, as one of ordinary skill in the art may appreciate, generally includes one or more antennas coupled to a radio for exchanging (e.g., transmitting and receiving) transmissions with a nearby base station.

In aspects, a UE provides UE data including location and channel quality information to the wireless communication network via the base station. Location information may be based on a current or last known position utilizing GPS or other satellite location services, terrestrial triangulation, a base station's physical location, or any other means of obtaining coarse or fine location information. Channel quality information may indicate a realized uplink and/or downlink transmission data rate, observed signal-to-interference-plus-noise ratio (SINR), and/or signal strength at the user device, or throughput of the connection. Channel quality information may be provided via, for example, an uplink pilot time slot, downlink pilot time slot, sounding reference signal, channel quality indicator (CQI), rank indicator, precoding matrix indicator, or some combination thereof. Channel quality information may be determined to be satisfactory or unsatisfactory, for example, based on exceeding or being less than a threshold. Location and channel quality information may take into account the user device capability, such as the number of antennas and the type of receiver used for detection. Processing of location and channel quality information may be done locally, at the base station, or at the individual antenna array of the base station. In other aspects, the processing of said information may be done remotely.

A service state of the UEs may include, for example, an in-service state when a UE is in-network (i.e., using services of a primary provider to which the UE is subscribed to, otherwise referred to as a home network carrier), or when the UE is roaming (i.e., using services of a secondary provider providing coverage to the particular geographic location of the UE that has agreements in place with the primary provider of the UE). The service state of the UE may also include, for example, an emergency-only state when the UE is out-of-network and there are no agreements in place between the primary provider of the UE and the secondary provider providing coverage to the current geographic location of the UE. Finally, the service state of the UE may also include, for example, an out-of-service state when there are no service providers at the particular geographic location of the UE.

The UE data may be collected at predetermined time intervals measured in milliseconds, seconds, minutes, hours, or days. Alternatively, the UE data may be collected continuously. The UE data may be stored at a storage device of the UE, and may be retrievable by the UE's primary provider as needed, and/or the UE data may be stored in a cloud-based storage database and may be retrievable by the UE's primary provider as needed. When the UE data is stored in the cloud-based storage database, the data may be stored in association with a data identifier mapping the UE data back to the UE, or alternatively, the UE data may be collected without an identifier for anonymity.

In accordance with a first aspect of the present disclosure, a method of operating a multi-stack antenna is provided. The method begins with receiving at least one signal from at least one user equipment (UE) at a multi-stack phased antenna array. The signal from the UE is received by each antenna element of the multi-stack phased antenna array. The at least one signal is then adapted by adjusting a received signal from each antenna element in time and phase to maximize in-phase signal strength.

A second aspect of the present disclosure provides a multi-stack phased antenna array. The antenna includes at least two antenna element layers with the at least two antenna element layers comprising a matrix of individual antenna elements. Each individual antenna element is electrically connected to a modular ratio combining engine. At least one dielectric layer is disposed between the at least two antenna element layers.

Another aspect of the present disclosure is directed to a non-transitory computer storage media storing computer-useable instructions that, when used by one or more processors, cause the processors to receive at least one signal from at least one UE at a multi-stack phased antenna array, wherein the at least one signal is received by each antenna element of the phased antenna array. The received signal is then adapted by the processors to adjust a received signal from each antenna element in time and phase to maximize in-phase signal strength.

FIG. 1 illustrates an example of a network environment 100 suitable for use in implementing embodiments of the present disclosure. The network environment 100 is but one example of a suitable network environment and is not intended to suggest any limitation as to the scope of use or functionality of the disclosure, and nor should the network environment 100 be interpreted as having any dependency or requirement to any one or combination of components illustrated.

Network environment 100 includes user equipment (UE) devices 102, 104, 106, 108, and 110, base station 114 (which may be a cell site or the like), multi-stack antenna array 144, and one or more communication channels 112. The communication channels 112 can communicate over frequency bands assigned to the carrier. In network environment 100, UE devices may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device (such as the computing device 600) that communicates via wireless communications with the base station 114 using multi-stack antenna array 144 in order to interact with a public or private network.

Figure 6:
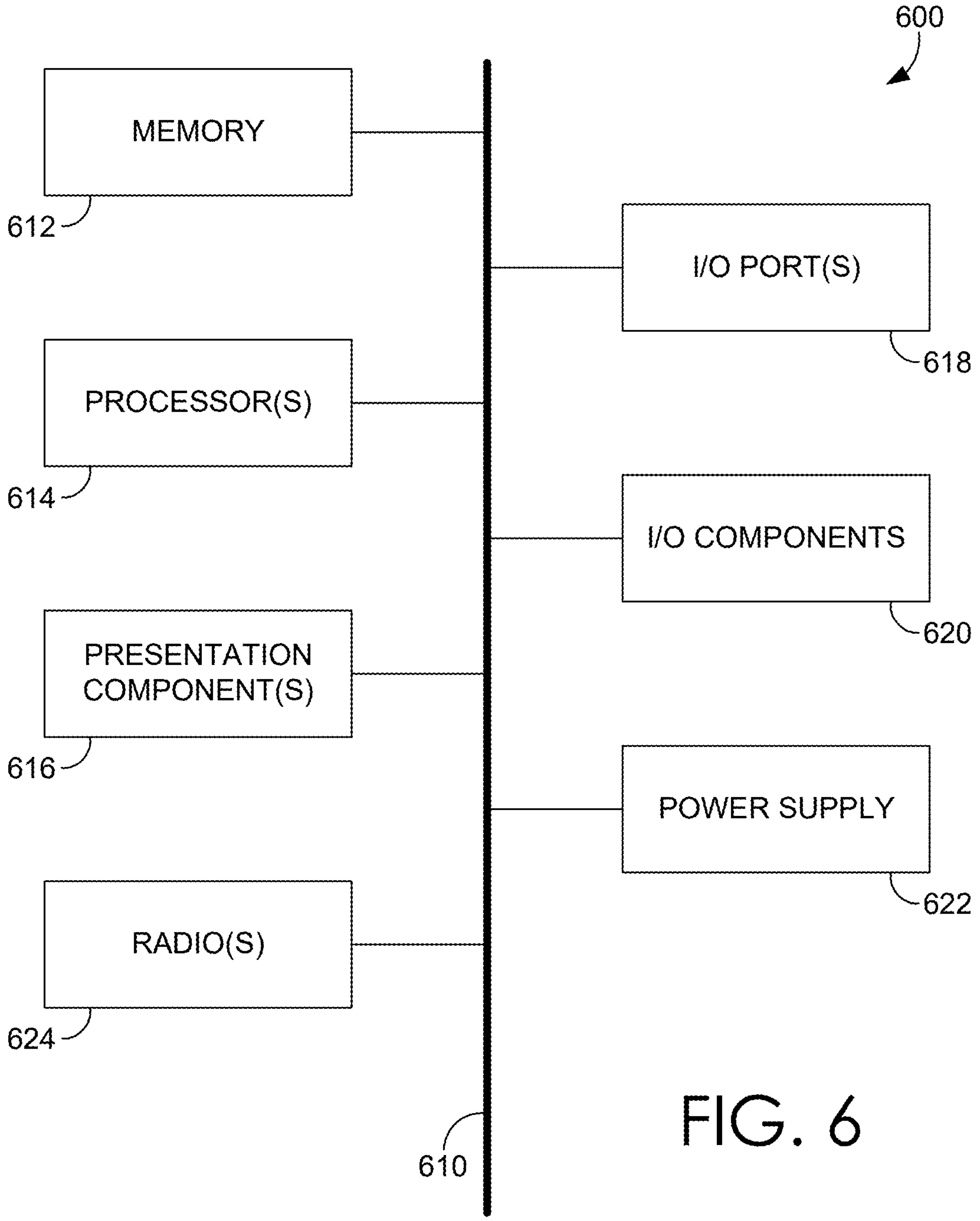
FIG. 6 depicts an exemplary computing device suitable for use in implementations of the present disclosure, in accordance with aspects herein.

In some aspects, each of the UEs 102, 104, 106, 108, and 110 may correspond to computing device 600 in FIG. 6. Thus, a UE can include, for example, a display(s), a power source(s) (e.g., a battery), a datastore(s), a speaker(s), memory, a buffer(s), a radio(s), and the like. In some implementations, for example, devices such as the UEs 102, 104, 106, 108, and 110 comprise a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, LTE, CDMA, or any other type of network.

In some cases, UEs 102, 104, 106, 108, and 110 in network environment 100 can optionally utilize one or more communication channels 112 to communicate with other computing devices (e.g., a mobile device[s], a server[s], a personal computer[s], etc.) through multi-stack antenna array 144 mounted on base station 114. Base station 114 may be a gNodeB in a 5G or 6G network as described herein.

The network environment 100 may be comprised of a telecommunications network(s), or a portion thereof. A telecommunications network might include an array of devices or components (e.g., one or more base stations), some of which are not shown. Those devices or components may form network environments similar to what is shown in FIG. 1, and may also perform methods in accordance with the present disclosure. Components such as terminals, links, and nodes (as well as other components) can provide connectivity in various implementations. Network environment 100 can include multiple networks, as well as being a network of networks, but is shown in simpler form so as to not obscure other aspects of the present disclosure.

The one or more communication channels 112 can be part of a telecommunication network that connects subscribers to their immediate telecommunications service provider (i.e., home network carrier). In some instances, the one or more communication channels 112 can be associated with a telecommunications provider that provides services (e.g., 3G network, 4G network, LTE network, 5G network, and the like) to user devices, such as UEs 102, 104, 106, 108, and 110. For example, the one or more communication channels may provide voice, SMS, and/or data services to UEs 102, 104, 106, 108, and 110, or corresponding users that are registered or subscribed to utilize the services provided by the telecommunications service provider. The one or more communication channels 112 can comprise, for example, a 1× circuit voice, a 3G network (e.g., CDMA, CDMA2000, WCDMA, GSM, or UMTS), a 4G network (WiMAX, LTE, or HSDPA), or a 5G network or a 6G network.

In some implementations, base station 114 is configured to communicate with UEs, such as UEs 102, 104, 106, 108, and 110, that are located within the geographic area, or cell, covered by radio antennas or multi-stack antenna arrays 144 of base station 114. The radio antennas of base station 114 may incorporate multi-stack antenna arrays 144 as described below in FIG. 3. Base station 114 may include one or more base stations, base transmitter stations, radios, antennas, antenna arrays, power amplifiers, transmitters/receivers, digital signal processors, control electronics, GPS equipment, and the like. In particular, base station 114 may selectively communicate with the user devices using dynamic beamforming.

As shown, base station 114 is in communication with a network component (shown as router 130) and at least a network database 120 via a backhaul channel 116. As the UEs 102, 104, 106, 108, and 110 collect individual status data, the status data can be automatically communicated by each of the UEs 102, 104, 106, 108, and 110 to the base station 114. Base station 114 may store the data communicated by the UEs 102, 104, 106, 108, and 110 at a network database 120. Alternatively, the base station 114 may automatically retrieve the status data from the UEs 102, 104, 106, 108, and 110, and similarly store the data in the network database 120. The data may be communicated or retrieved and stored periodically within a predetermined time interval which may be in seconds, minutes, hours, days, months, years, and the like. With the incoming of new data, the network database 120 may be refreshed with the new data every time, or within a predetermined time threshold so as to keep the status data stored in the network database 120 current. For example, the data may be received at or retrieved by the base station 114 every 10 minutes, and the data stored at the network database 120 may be kept current for 30 days, which means that status data that is older than 30 days would be replaced by newer status data at 10-minute intervals. As described above, the status data collected by the UEs 102, 104, 106, 108, and 110 can include, for example, service-state status, the respective UE's current geographic location, a current time, a strength of the wireless signal, available networks, and the like.

The router 130 comprises a memory 132, a maximum ratio combining (MRC) engine 134, and a scheduler 136. All determinations, calculations, and data further generated by the MRC engine 134 and scheduler 136 may be stored at the memory 132 and also at the datastore 142. Although the router 130 is shown as a single component comprising the memory 132, MRC engine 134, and the scheduler 136, it is also contemplated that each of the memory 132, MRC engine 134, and scheduler 136 may reside at different locations, be its own separate entity, and the like, within the home network carrier system.

The router 130 is configured to retrieve signal information, UE device information, latency information, signal information, antenna information, and metrics from the base station 114, multi-stack antenna array 144, or one of the UEs 102, 104, 106, 108, and 110. The MRC engine 134 determines which antenna or antennas of the multi-stack antenna on base station 114 is used by a given UE to communicate. The scheduler 136 can monitor the activity of the UEs 102, 104, 106, 108, and 110 in the network. The MRC engine 134 determines which antenna or antennas of the multi-stack antenna array 144 are used by each of UEs 102, 104, 106, 108, and 110 for communication and acts in conjunction with the scheduler 136 to schedule the transmissions. Once the MRC engine 134 has computed the diversity combining for a UE, the scheduler sends the antenna information to the UE.

Figure 2:
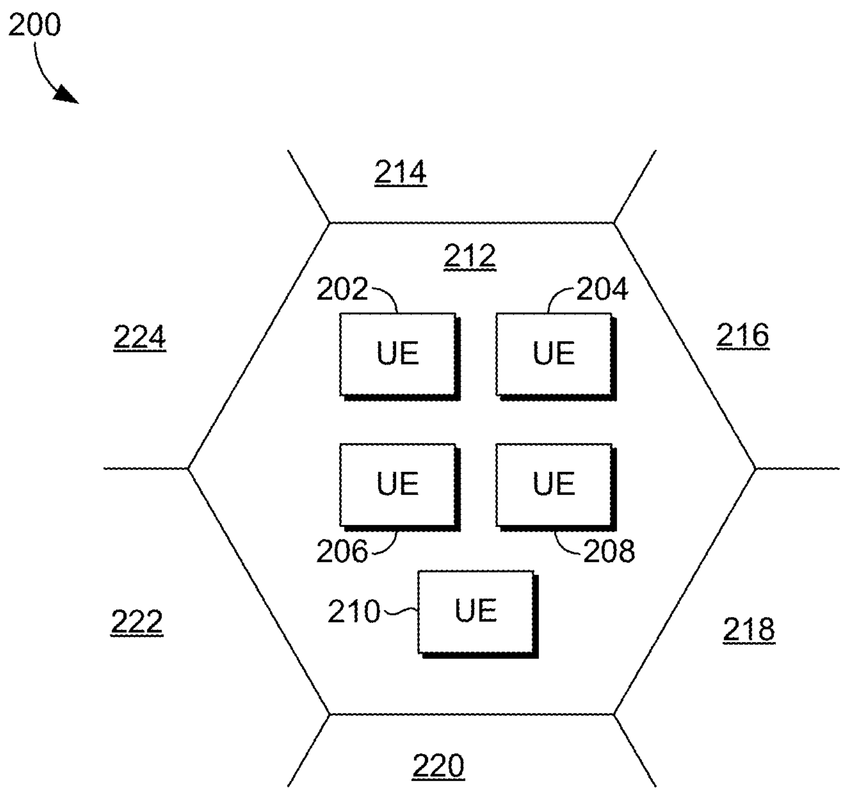
FIG. 2 depicts a cellular network suitable for use in implementations of the present disclosure, in accordance with aspects herein.

FIG. 2 depicts a cellular network suitable for use in implementations of the present disclosure, in accordance with aspects herein. For example, as shown in FIG. 2, each geographic area in the plurality of geographic areas may have a hexagonal shape such as a hexagon representing a geographic area 200 having cells 212, 214, 216, 218, 220, 222, and 224, each including base station 114, backhaul channel 116, antenna for sending and receiving signals over communication channels 112, network database 120, and router 130. The size of the geographic area 200 may be predetermined based on a level of granularity, detail, and/or accuracy desired for the determinations/calculations done by the systems, computerized methods, and computer storage media. A plurality of UEs may be located within each geographic area collecting UE data within the geographic area at a given time. For example, as shown in FIG. 2, UEs 202, 204, 206, 208, and 210 may be located within geographic area 200 collecting UE data that is useable by router 130, in accordance with aspects herein. UEs 202, 204, 206, 208, and 210 can move within the cell they are currently occupying, such as cell 212, and can move to other cells such as adjoining cells 214, 216, 218, 220, 222, and 224.

Figure 3:
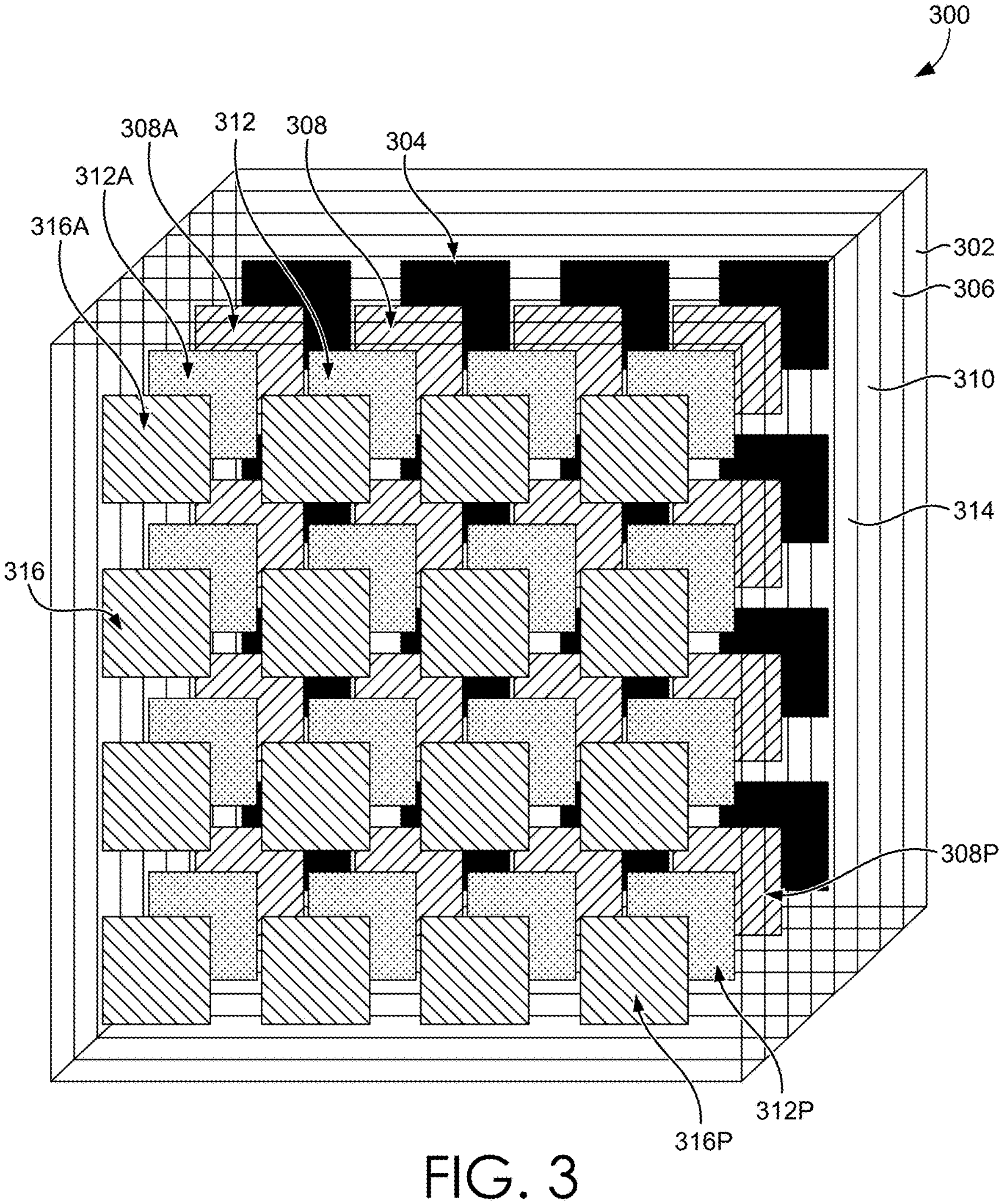
FIG. 3 depicts a diagram of an exemplary multi-stack antenna, suitable for use in a network environment, in accordance with aspects herein.

FIG. 3 depicts a diagram of an exemplary multi-stack antenna, suitable for use in a network environment, in accordance with aspects herein. The multi-stack antenna assembly 300 illustrates an antenna array arranged in a 4×4×4 element configuration. Each antenna element layer has a 4×4 configuration of antenna elements, and each antenna element layer is separated from other antenna element layers by a substrate. A first substrate 302 has a first antenna element layer 304 overlaid. First antenna element layer 304 includes 16 antenna elements arranged in a 4×4 configuration. On top of first antenna element layer 304 is a second substrate layer 306. On top of second substrate layer 306 is second antenna element layer 308 with another 4×4 array of antenna elements 308*a*-308*p*, with 16 total antenna elements. Other designs for the antenna element layers are possible, with one embodiment providing eight columns with eight outputs. On top of second antenna element layer 308 is third substrate layer 310. On top of third substrate layer 310 is third antenna element layer 312 with another 4×4 array of antenna elements 312*a*-312*p*, with 16 total antenna elements. On top of third antenna element layer 312 is fourth substrate layer 314 with fourth antenna element layer 316 on top. Fourth antenna element layer 316 also has a 4×4 array of 16 antenna elements 316*a*-316*p*.

The dimensions of the antenna elements, such as 316*a*-316*p*, the spacing between each antenna element, and the spacing between each antenna element layer determines the antenna polarization, beamwidth, beam direction, and side-lobes in conjunction with the frequency band and the center frequency of the multi-stack antenna assembly 300. In addition, the depth or thickness of each antenna layer as well as the thickness of the substrate layer also affect antenna polarization, beamwidth, beam direction, and sidelobes. Antennas of each layer are then connected together, and the multiple layers are connected together through a maximum ratio combining (MRC) engine 134 of FIG. 1. For example, the antennas of first antenna element layer 304 are connected together, the antennas of second antenna element layer 308 are connected together, the antennas of third antenna element layer 312 are connected together, and the antennas of fourth antenna element layer 316 are connected together via the MRC engine 134. Then, first antenna element layer 304 is connected to second antenna element layer 308, second antenna element layer 308 is connected to third antenna element layer 312, and third antenna element layer 312 is connected to fourth antenna element layer 316 via the MRC engine 134.

Figure 4:
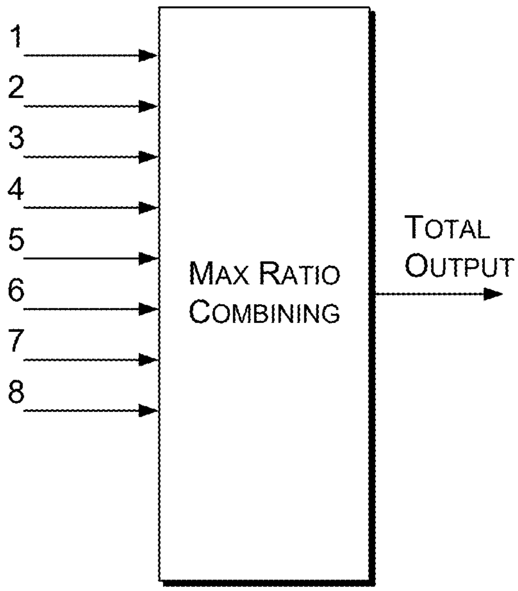
FIG. 4 is a diagram of a maximum ratio combining (MRC), in which implementations of the present disclosure may be employed, in accordance with aspects here.

FIG. 4 is a diagram of a maximum ratio combining (MRC), in which implementations of the present disclosure may be employed, in accordance with aspects herein. MRC is a method of diversity combining in which the signals from each channel are added together at selected phases and timing to maximize signal from a specific direction. In the multi-stack antenna shown in FIG. 3, each layer may be added together. The gain of each layer may be made proportional to the root mean square (RMS) signal level and made inversely proportional to the mean square noise level in that channel. Different proportionality constants may be used for each channel.

FIG. 4 depicts eight antenna signals combined in MRC. The MRC may be performed for each antenna layer of FIG. 3. In addition, the antenna layers of FIG. 3, that is, antenna layers 304, 308, 312, and 316 may also undergo MRC. Additional layers of antennas may be added. In MRC, each signal branch is multiplied by a weight factor that is proportional to the signal amplitude. The result is the total output shown in FIG. 4.

Figure 5:
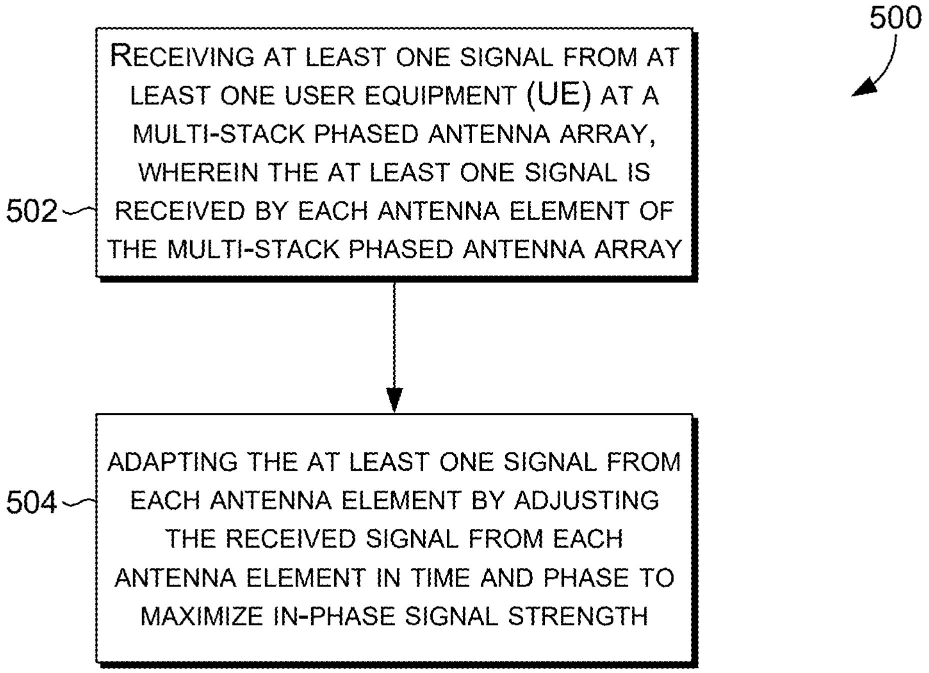
FIG. 5 is a flow diagram of an exemplary method for operating a multi-stack phased antenna array, in accordance with aspects herein.

FIG. 5 is a flow diagram of an exemplary method for operating a multi-stack phased antenna array, in accordance with aspects herein. The method 500 begins with receiving at least one signal from at least one UE at a multi-stack phased antenna array in step 502. The at least one signal is received by each antenna element of the multi-stack phased antenna array. The method then continues in step 504 with adapting the at least one signal by adjusting the received signal from each antenna element in time and phase to maximize in-phase signal strength. The method 500 may also provide for generating at least one signal to be transmitted to the at least one UE. The signal is sent to the modular ratio combining engine where the signal is split to provide a portion of the signal to each antenna element in each discrete phase to maximize the transmitted beam strength. The modification of the signal may be further adapted to transmit to a second UE, with the portion of the signal sent to each antenna element being modified. The modification is selected to increase the gain of the antenna, and it may be increased to one. A weighting factor may also be used to increase the gain, and the gain may be increased in each branch of a signal. The weight factor may be proportional to an amplitude of the signal.

FIG. 6 depicts an exemplary computing device suitable for use in implementations of the present disclosure, in accordance with aspects herein. With continued reference to FIG. 6, computing device 600 includes bus 610 that directly or indirectly couples the following devices: memory 612, one or more processors 614, one or more presentation components 616, input/output (I/O) ports 618, I/O components 620, radio 624, and power supply 622. Bus 610 represents what may be one or more buses (such as an address bus, data bus, or combination thereof). Although the devices of FIG. 6 are shown with lines for the sake of clarity, in reality, delineating various components is not so clear, and metaphorically, the lines would more accurately be grey and fuzzy. For example, one may consider a presentation component such as a display device to be one of I/O components 620. Also, processors, such as one or more processors 614, have memory. The present disclosure hereof recognizes that such is the nature of the art, and reiterates that FIG. 6 is merely illustrative of an exemplary computing environment that can be used in connection with one or more implementations of the present disclosure. Distinction is not made between such categories as “workstation,” “server,” “laptop,” “handheld device,” etc., as all are contemplated within the scope of FIG. 6 and refer to “computer” or “computing device.”

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

Computing device 600 typically includes a variety of computer-readable media. Computer-readable media can be any available media that can be accessed by computing device 600 and includes both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVDs) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 612 includes computer storage media in the form of volatile and/or non-volatile memory. Memory 612 may be removable, non-removable, or a combination thereof. Exemplary memory includes solid-state memory, hard drives, optical-disc drives, etc. Computing device 600 includes one or more processors 614 that read data from various entities such as bus 610, memory 612 or I/O components 620. One or more presentation components 616 present data indications to a person or other device. Exemplary one or more presentation components 616 include a display device, speaker, printing component, vibrating component, etc. I/O ports 618 allow computing device 600 to be logically coupled to other devices including I/O components 620, some of which may be built into computing device 600. Illustrative I/O components 620 include a microphone, joystick, game pad, satellite dish, scanner, printer, wireless device, etc.

The radio 624 represents one or more radios that facilitate communication with a wireless telecommunications network. While a single radio 624 is shown in FIG. 6, it is contemplated that there may be more than one radio 624 coupled to the bus 610. In aspects, the radio 624 utilizes a transmitter to communicate with the wireless telecommunications network. Illustrative wireless telecommunications technologies include CDMA, GPRS, TDMA, GSM, and the like. The radio 624 may additionally or alternatively facilitate other types of wireless communications including Wi-Fi, WiMAX, LTE, 3G, 4G, LTE, 5G, NR, VOLTE, or other VOIP communications. As can be appreciated, in various embodiments, radio 624 can be configured to support multiple technologies and/or multiple radios can be utilized to support multiple technologies. A wireless telecommunications network might include an array of devices, which are not shown so as to not obscure more relevant aspects of the disclosure. Components such as a base station, a communications tower, or even base stations (as well as other components) can provide wireless connectivity in some embodiments.

Many different arrangements of the various components depicted, as well as components not shown, are possible without departing from the scope of the claims below. Embodiments of this technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. A method of operating a multi-stack phased antenna array in a network, the method comprising:

receiving at least one signal from at least one user equipment (UE) at the multi-stack phased antenna array, wherein the multi-stack phased antenna array comprises at least two antenna element layers, each antenna element layer of the at least two antenna element layers comprising a matrix of individual antenna elements, and each individual antenna element is electrically connected to a modular ratio combining engine configured to perform maximum ratio combining, wherein the at least one signal is received by each individual antenna element of the multi-stack phased antenna array; and adapting the at least one signal from each individual antenna element by adjusting the received signal from each individual antenna element in time and phase to maximize in-phase signal strength.

2. The method of claim 1, further comprising:

generating at least one signal to be transmitted to the at least one UE;

transmitting the at least one signal to be transmitted to the modular ratio combining engine; and splitting the at least one signal to be transmitted, by the modular ratio combining engine, to provide a portion of the signal to each antenna element in each discrete phase to maximize transmitted beam strength.

3. The method of claim 2, wherein the modular ratio combining engine adapts the portion of the signal to each antenna element to transmit to a second UE.

4. The method of claim 1, wherein modifying the at least one signal increases a gain of the signal.

5. The method of claim 1, further comprising modifying, by the modular ratio combining engine, a discrete phase of the at least one signal to and from each antenna element to maximize a signal strength to and from each UE.

6. A non-transitory computer storage media storing computer-useable instructions that, when used by one or more processors, cause the processors to:

receive at least one signal from at least one user equipment (UE) at a multi-stack phased antenna array, wherein the multi-stack phased antenna array comprises at least two antenna element layers, each antenna element layer of the at least two antenna element layers comprising a matrix of individual antenna elements, and each individual antenna element is electrically connected to a modular ratio combining engine configured to perform maximum ratio combining, wherein the at least one signal is received by each individual antenna element of the phased antenna array; and adapt the at least one signal from each individual antenna element by adjusting the received signal from each individual antenna element in time and phase to maximize in-phase signal strength.

7. The non-transitory computer storage media of claim 6, further comprising:

generate at least one signal to be transmitted to the at least one UE;

transmit the at least one signal to be transmitted to a modular ratio combining engine; and split the at least one signal to be transmitted by the modular ratio combining engine to provide a portion of the signal to each antenna element in each discrete phase to maximize transmitted beam strength.

8. The non-transitory computer storage media of claim 7, wherein the modular ratio combining engine adapts the portion of the signal to each antenna element to transmit to a second UE.

9. The non-transitory computer storage media of claim 7, further comprising, modify, by the modular ratio combining engine, the discrete phase of a signal to and from each antenna element to maximize a signal strength to and from each UE.

10. The non-transitory computer storage media of claim 7, wherein the modular ratio combining engine multiplies each branch of a signal by a weight factor.

11. The non-transitory computer storage media of claim 10, wherein the weight factor is proportional to an amplitude of the signal.

12. The non-transitory computer storage media of claim 11, wherein the modular ratio combining engine weighting factor is selected to produce a gain of one.

13. The non-transitory computer storage media of claim 12, wherein the modular ratio combining engine adds a signal from at least two antenna elements coherently.

14. The non-transitory computer storage media of claim 13, wherein the modular ratio combining engine maximizes antenna gain.

15. A system for operating a multi-stack phased antenna array in a network, the system comprising:

one or more processors; and one or more non-transitory computer storage hardware devices storing computer-usable instructions that, when used by the one or more processors, cause the one or more processors to:

receive at least one signal from at least one user equipment (UE) at the multi-stack phased antenna array, wherein the multi-stack phased antenna array comprises at least two antenna element layers, each antenna element layer of the at least two antenna element layers comprising a matrix of individual antenna elements, and each individual antenna element is electrically connected to a modular ratio combining engine configured to perform maximum ratio combining, wherein the at least one signal is received by each individual antenna element of the multi-stack phased antenna array; and adapt the at least one signal from each individual antenna element by adjusting the received signal from each individual antenna element in time and phase to maximize in-phase signal strength.

16. The system of claim 15, further comprising:

generating at least one signal to be transmitted to the at least one UE;

transmitting the at least one signal to be transmitted to the modular ratio combining engine; and splitting the at least one signal to be transmitted, by the modular ratio combining engine, to provide a portion of the signal to each antenna element in each discrete phase to maximize transmitted beam strength.

17. The system of claim 15, wherein the modular ratio combining engine adapts the portion of the signal to each antenna element to transmit to a second UE.

18. The system of claim 15, wherein modifying the at least one signal increases a gain of the signal.

19. The system of claim 15, further comprising modifying, by the modular ratio combining engine, a discrete phase of the at least one signal to and from each antenna element to maximize a signal strength to and from each UE.

* * * * *